United States Patent
Purcell et al.

(10) Patent No.: US 9,928,274 B2
(45) Date of Patent: *Mar. 27, 2018

(54) DYNAMICALLY ADJUST DUPLICATE SKIPPING METHOD FOR INCREASED PERFORMANCE

(71) Applicant: International Business Machines Corporation, Armonk, NY (US)

(72) Inventors: Terence P. Purcell, Springfield, IL (US); Thomas A. Beavin, Milpitas, CA (US); Li Xia, San Jose, CA (US); Michael R. Shadduck, Los Altos, CA (US); Paramesh S. Desai, San Jose, CA (US); Qianyang Yu, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 163 days.

This patent is subject to a terminal disclaimer.

(21) Appl. No.: 14/557,010

(22) Filed: Dec. 1, 2014

(65) Prior Publication Data

US 2015/0220596 A1    Aug. 6, 2015

Related U.S. Application Data

(63) Continuation of application No. 14/170,316, filed on Jan. 31, 2014.

(51) Int. Cl.
  *G06F 17/30*    (2006.01)
(52) U.S. Cl.
  CPC .. *G06F 17/30442* (2013.01); *G06F 17/30312* (2013.01); *G06F 17/30321* (2013.01); *G06F 17/30336* (2013.01)

(58) Field of Classification Search
  CPC ......... G06F 17/30312; G06F 17/30321; G06F 17/30336
  (Continued)

(56) References Cited

U.S. PATENT DOCUMENTS

| 5,758,353 A | * | 5/1998 | Marquis | ............ | G06F 17/30961 |
| | | | | | 707/744 |
| 6,578,026 B1 | * | 6/2003 | Cranston | ........... | G06F 17/30327 |
| | | | | | 707/696 |

(Continued)

FOREIGN PATENT DOCUMENTS

| WO | 199832064 A2 | 7/1998 |
| WO | 2003085562 A1 | 10/2003 |

OTHER PUBLICATIONS

IBM et al.; "Technique for Duplicate Key Elimination During Data Loading"; An IP.com Prior Art Database Technical Disclosure; http://ip.com/IPCOM/000123711D; Apr. 5, 2005.

(Continued)

*Primary Examiner* — Mark E Hershley
(74) *Attorney, Agent, or Firm* — Patterson + Sheridan, LLP

(57) ABSTRACT

Embodiments presented herein provide techniques for setting different methods of skipping duplicate values when executing a query statement in a relational database. A distance between a two distinct keys in an index, a current index key and a next distinct index key, are estimated. Based on the estimated distance, an appropriate duplicate-skipping method is determined. If the proximity between the distinct keys is relatively far apart (e.g., the keys reside in index pages that are at least an index page apart), then a "big skip" method is performed. Otherwise, if the proximity between the distinct keys is relatively near (e.g., the keys reside in the same index page), then a "little skip" method is performed.

21 Claims, 4 Drawing Sheets

(58) Field of Classification Search
USPC .......................................................... 707/715
See application file for complete search history.

(56) References Cited

U.S. PATENT DOCUMENTS

| | | | | |
|---|---|---|---|---|
| 6,970,865 | B1* | 11/2005 | Plasek | G06F 17/30327 |
| 7,516,149 | B2* | 4/2009 | Motwani | G06F 17/30303 |
| 9,170,791 | B1* | 10/2015 | Ciubotariu | G06F 17/30 |
| 2002/0087500 | A1* | 7/2002 | Berkowitz | G06F 17/30371 |
| 2003/0204513 | A1* | 10/2003 | Bumbulis | G06F 17/30327 |
| 2005/0044102 | A1* | 2/2005 | Gupta | G06F 17/30418 |
| 2005/0222978 | A1* | 10/2005 | Drory | G06F 17/30241 |
| 2006/0200501 | A1* | 9/2006 | Holenstein | G06F 17/30581 |
| 2006/0200533 | A1* | 9/2006 | Holenstein | G06F 17/30578 |
| | | | | 709/208 |
| 2007/0011143 | A1* | 1/2007 | Fuh | G06F 17/30864 |
| 2008/0288524 | A1* | 11/2008 | Dumitru | G06F 17/30312 |
| 2009/0083238 | A1* | 3/2009 | Chaudhuri | G06F 17/30501 |
| 2011/0173162 | A1* | 7/2011 | Anderson | G06F 11/1076 |
| | | | | 707/692 |
| 2012/0290541 | A1* | 11/2012 | Anderson | G06F 11/106 |
| | | | | 707/685 |
| 2012/0310902 | A1* | 12/2012 | Patterson | G06F 17/30864 |
| | | | | 707/692 |
| 2015/0032758 | A1* | 1/2015 | Schneider | G06F 17/30336 |
| | | | | 707/741 |
| 2015/0066943 | A1* | 3/2015 | Isomatsu | G06F 17/30321 |
| | | | | 707/741 |
| 2015/0363467 | A1* | 12/2015 | Cao | G06F 17/30587 |
| | | | | 707/719 |

OTHER PUBLICATIONS

IBM et al.; "Multidimensional Index Structure with Multi-Level Entry and Skp-Level Search for Partially-Specified Queries"; An IP.com Prior Art Database Technical Disclosure; http://ip.com/IPCOM/000118210D; Apr. 1, 2005.

* cited by examiner

DYNAMICALLY ADJUST DUPLICATE SKIPPING METHOD FOR INCREASED PERFORMANCE

CROSS-REFERENCE TO RELATED APPLICATION

This application is a continuation of co-pending U.S. patent application Ser. No. 14/170,316, filed Jan. 31, 2014. The aforementioned related patent application is herein incorporated by reference in its entirety.

BACKGROUND

Technical Field

Embodiments disclosed herein relate to query optimization in a relational database. More specifically, techniques are disclosed for adjusting duplicate-skipping methods when executing a database query.

Description of the Related Art

Relational database management systems (DBMS) use relational techniques for storing and retrieving data in a database. Users request access to data in the database by issuing a database access request, such as a query statement. A query statement is a set of commands for retrieving, inserting, or modifying data from the database.

Many database query statements for data retrieval require removal of duplicate results by syntax (e.g., SET FUNCTION DISTINCT and GROUP BY in SQL). Other database query statements do not require duplicate values to be included in the result set (e.g., sub-query statements). When executing a query, a DBMS may remove duplicates through various methods involving scanning an index of the database for distinct values. A database index is a data structure used to quickly locate data without having to search every row in a database table. In a relational database, the index is a copy of select columns of data from the table that can be searched efficiently.

One current approach for removing duplicate values from a result set is to skip index keys with duplicate values in leading index columns. Using this approach, DBMS scans an index for distinct values. When the DBMS identifies a distinct value, the DBMS skips over duplicates of that value until identifying the next distinct value. However, this approach incurs significant overhead when scanning a range of index keys scanned which contains few duplicate values. Further, the method used to skip duplicate values remains the same regardless of the proximity of two distinct keys within the index. This results in unnecessarily incurred overhead, and thus, inefficient performance.

SUMMARY

Embodiments presently disclosed herein provide a method for skipping duplicate index keys in a database index to identify records in a database that satisfy a database query. The method generally includes estimating a distance in the database index between a current index key and a next index key that is distinct from the current index key. The method generally includes selecting a duplicate-skipping method based on the estimated distance. The method also generally includes performing the selected index-skipping method to identify the next distinct index key.

Another embodiment of the invention includes a computer program product, the computer program product comprising a computer-readable storage medium having computer-readable program code embodied therewith. The code, when executed on a processor, may generally perform an operation for skipping duplicate index keys in a database index to identify records in a database that satisfy a database query. The operation may generally include estimating a distance in the database index between a current index key and a next index key that is distinct from the current index key. The operation may also include selecting a duplicate-skipping method based on the estimated distance. The operation may also include performing the selected index-skipping method to identify the next distinct index key.

Still another embodiment of the invention includes a system having a processor and a memory containing an operation. The operation may generally include estimating a distance in the database index between a current index key and a next index key that is distinct from the current index key. The operation may generally include selecting a duplicate-skipping method based on the estimated distance. The operation may generally include performing the selected index-skipping method to identify the next distinct index key.

BRIEF DESCRIPTION OF THE SEVERAL VIEWS OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
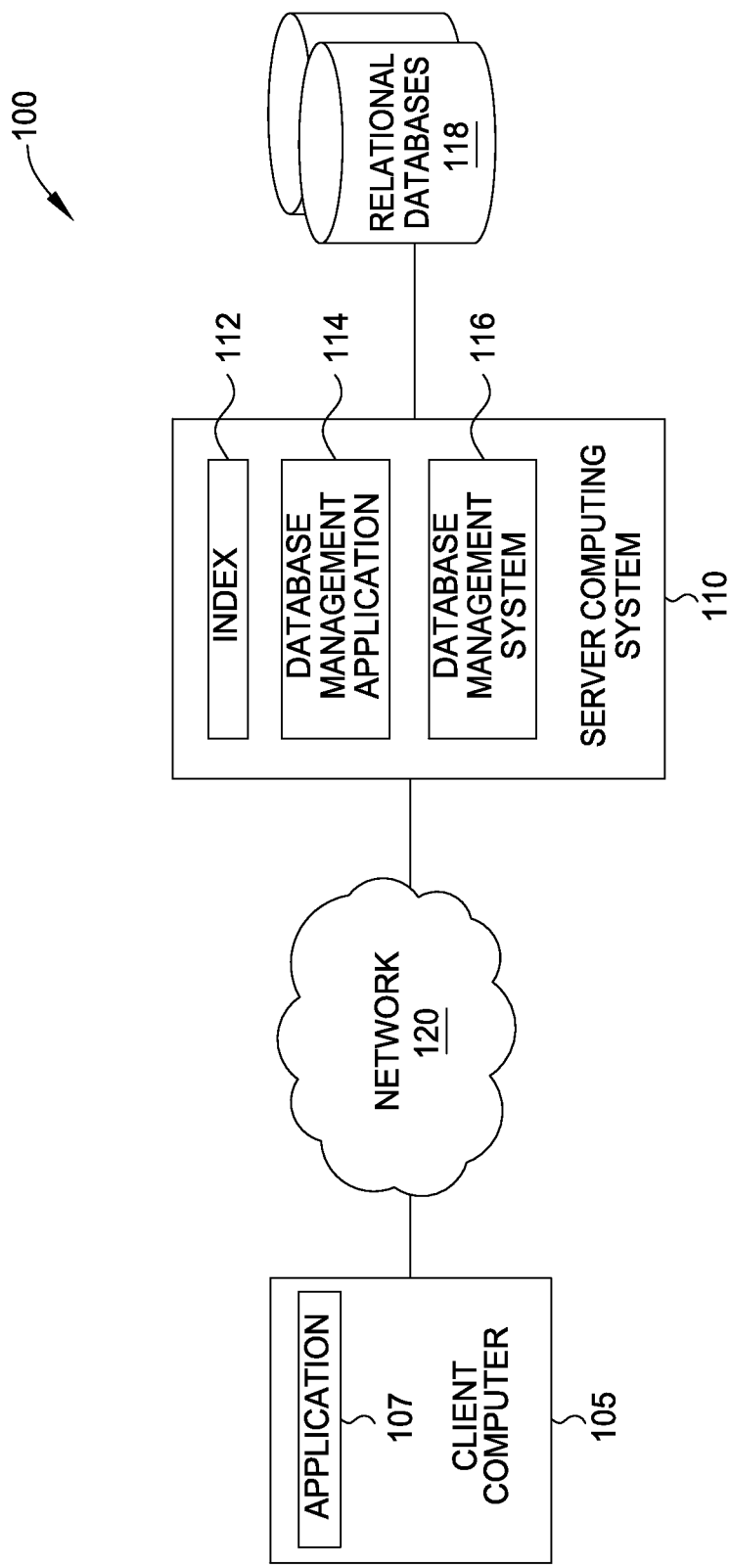
FIG. 1 illustrates an example computing environment, according to one embodiment.

Embodiments presented herein provide techniques for selecting a method to skip duplicate values when executing a query statement. For example, the embodiments provide techniques for selecting a skipping method when executing a Structured Query Language (SQL) statement against a relational database. In one embodiment, an estimated distance between two distinct and sequential keys in an index of the database is used to determine an appropriate skipping method to perform in response to a query statement.

In one embodiment, when executing a query statement requesting distinct values, a database management application probes an index tree of the database table identified in the query. The database management application scans a given index and estimates a distance between a current index key and a next distinct (i.e., non-duplicate) index key.

Based on the estimated distance between keys, the database management application may select a corresponding method, such as a "big skip" method or a "little skip" method. The "big skip" method may include performing a binary search algorithm from the root of the index tree. The "little skip" method may include performing a binary search algorithm within the current index page. If the estimated distance between the keys is relatively far (e.g., at least an index leaf page apart), then the database management application sets the method to perform the "big skip" method. Otherwise, if the current index key and the next distinct index key reside within the same index page, the database management application sets the duplicate-skipping method depending on the estimated distance between the current index key and the next distinct index key, relative to their positions within the index page. The database management application estimates the relative distance based on properties of leaf pages of the index, such as the high and low bounds and the number of index keys in a page. If the two keys are separated by relatively many index keys, the database management application sets the method to perform the "little skip" method. However, if the two keys are separated by relatively few duplicate values, the database management application sets the method to perform a "get next" operation to iterate through consecutive index keys to retrieve the next distinct index key.

Note, for the approach described below to work effectively, an index should include at least some duplicate values. That is, if the index already stores a collection of distinct values, the approach may increase the overhead of query execution. In one embodiment, the database management application may ascertain whether an index has duplicate values through evaluating statistics of the index, e.g., by evaluating the number of distinct values relative to the number of rows in the database table, etc. Further, the database management application may be configured to determine whether to evaluate the index for adjusting the skipping method. For example, if the database management application determines (e.g., based on statistic information collected) that an index includes relatively few duplicate values, the database management application does not evaluate which method to perform, and instead may perform a default iterative method. Whether the index includes few duplicate values may be determined by a threshold. Doing so avoids computational overhead incurred in selecting skipping methods in contexts where the index includes few duplicate values.

Embodiments presented herein provide techniques for setting duplicate-skipping methods when executing a query statement. Setting the skipping methods based on estimated distances between distinct index keys provides an efficient way to determine whether distinct index keys are sparse, thus ensuring that a next distinct index key may be identified in a relatively efficient manner. Further, setting the skipping methods reduces overhead incurred by arbitrarily skipping duplicates to reach a next distinct value, even in the case where no index keys can be skipped throughout the scan of the index. Additionally, the overhead caused by scanning index pages is reduced.

FIG. 1 illustrates an example computing environment 100, according to one embodiment. As shown, the computing environment 100 includes a client computer 105 and a server computing system 110, each connected to a communications network 115.

Illustratively, the client computer 105 includes an application 110 that communicates with the server computing system 110 to submit database requests (e.g., query statements) to the server computing system 110. Although shown as a single client computer, the client computer 105 is included to be representative of a single client or multiple clients. The server computing system 110 may include an index 112, a database management application 114, and a relational database management system (DBMS) 116.

The database management application 114 processes requests sent by the client computer 105 to the server computing system 110. As part of doing so, the database management application 114 sends query statements to the DMBS 116. The DBMS 116 includes one or more software applications configured to manage relational databases 118. The index 112 may store values corresponding to the database table columns managed by the database management application 114. Specifically, the index 112 may store key values corresponding to a key table column. The index 112 may be structured as a binary search tree, where index keys are organized in leaf nodes (index pages). Doing so allows index pages to be ordered in a sequential manner, which enables certain index pages to be skipped during a search.

Figure 2:
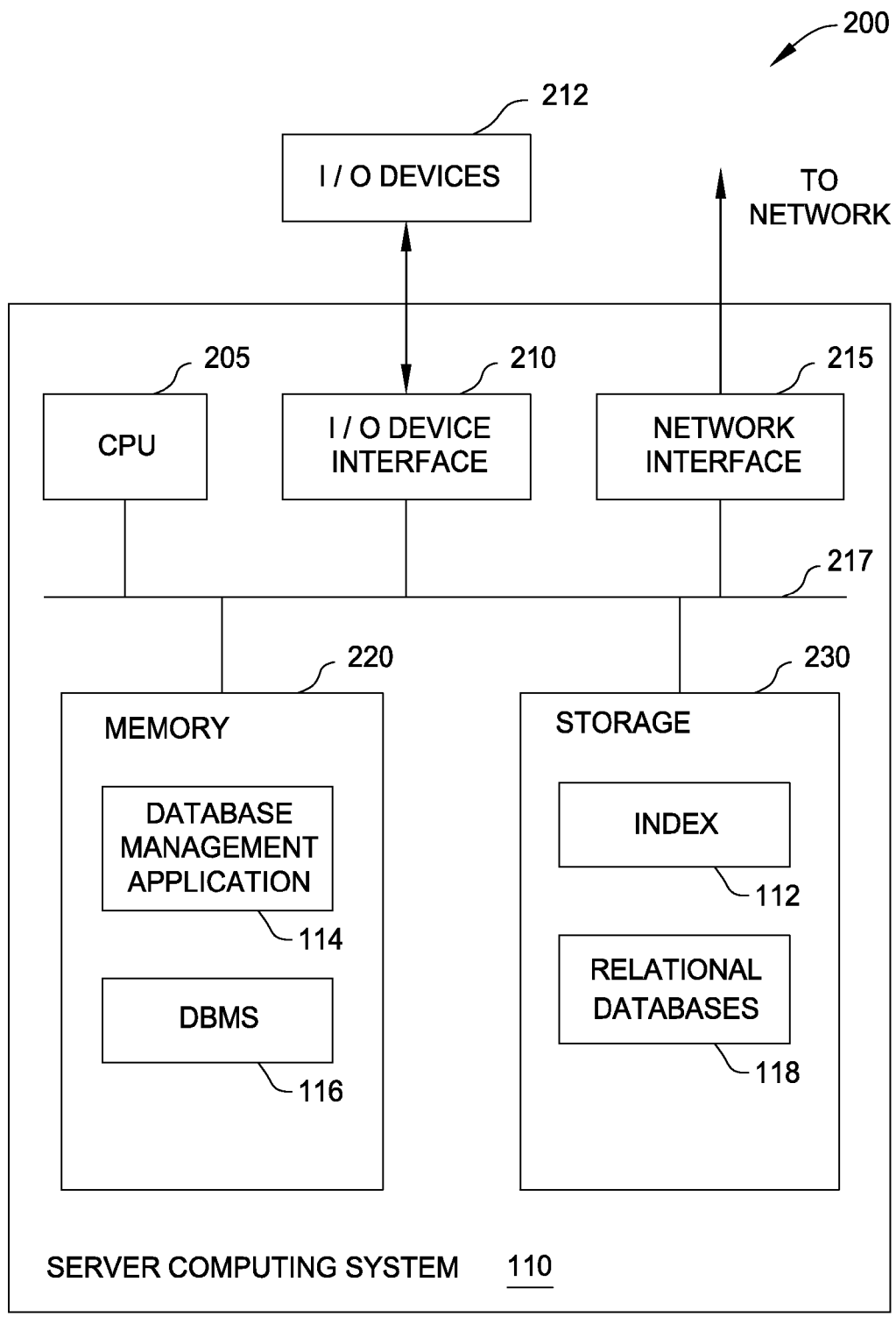
FIG. 2 illustrates an example computing system configured to set duplicate skipping methods while executing a database query, according to one embodiment.

FIG. 2 further illustrates an example server computing system 110 configured with a database management system that is configured to adjust a variety of duplicate-skipping methods, according to one embodiment. As shown, the server computing system 200 includes, without limitation, a central processing unit (CPU) 205, a network interface 215, an interconnect (i.e., bus) 217, a memory 220, and storage 230. The server computing system 200 also may include an I/O device interface 210 connecting I/O devices 212 (e.g., keyboard, display, and mouse devices) to the server computing system 110.

The CPU 205 may retrieve and execute programming instructions stored in the memory 220. Similarly, the CPU 205 may retrieve and store application data residing in the memory 220. The interconnect 217 may facilitate transmission, such as of programming instructions and application data, among the CPU 205, I/O device interface 210, storage 230, network interface 215, and memory 220. CPU 205 is included to be representative of a single CPU, multiple CPUs, a single CPU having multiple processing cores, and the like. Additionally, the memory 220 is included to be representative of a random access memory. Furthermore, the storage 230 may be a disk drive storage device. As shown, the memory 220 includes the database management application 114 and the DBMS 116.

Although shown as a single unit, the storage 230 may be a combination of fixed and/or removable storage devices, such as fixed disc drives, floppy disc drives, tape drives, removable memory cards or optical storage, network attached storage (NAS), or a storage area-network (SAN). As shown, the storage 230 includes the index 112 and the relational databases 118.

In one embodiment, the database management application 114 receives a database query statement from a client computer. The database query statement may specify that that only distinct values should be retrieved from the relational databases 118 for values from at least one of the columns referenced by the query. In such a case, the database management application 114 may determine a duplicate-skipping method to perform when retrieving distinct values from the index 112. To do so, the database management application 114 may scan the tree of the index 112 within a given start and stop key range. For example, the range may include every leaf page of the index 112. As another example, the range may be constrained by specified predicates.

The database management application 114 may set a skipping method based on a proximity between distinct keys. When initially probing the index 112, the database management application 114 sets an initial index key in an initial leaf page as a current index key. Further, the database management application 114 generates a search index key having an arbitrary value. The search index key is used to locate a next distinct index key. The arbitrary value generated for the search index key should be greater than the value of the current index key if the direction of the scan is forward, or less than the value of the current index key if the direction of the scan is in reverse.

If the current index key and the next distinct index key reside in index leaf pages at least an index page apart, then the database management application may determine that the keys are within a "far" proximity. A "far" proximity may result from the current index key having many duplicate values. If the current index key and the next distinct index key reside in the same index leaf page, the database management application may determine the keys are within "near" proximity. A "near" proximity may result from the current index key having relatively few duplicate values. Of course, the "far" and "near" proximities may be configured based on the needs of the DBMS 116.

After estimating the distance between the distinct keys, the database management application 114 sets the duplicate-skipping method depending on whether the proximity is "far" or "near." As further described below, if the proximity between the distinct keys is "far," the database management application 114 performs a "big skip" method that searches through multiple index pages. Otherwise, if the proximity is "near," the database management application 114 performs a "little skip" method that has a comparatively smaller scope of search than the "big skip" method.

Figure 3:
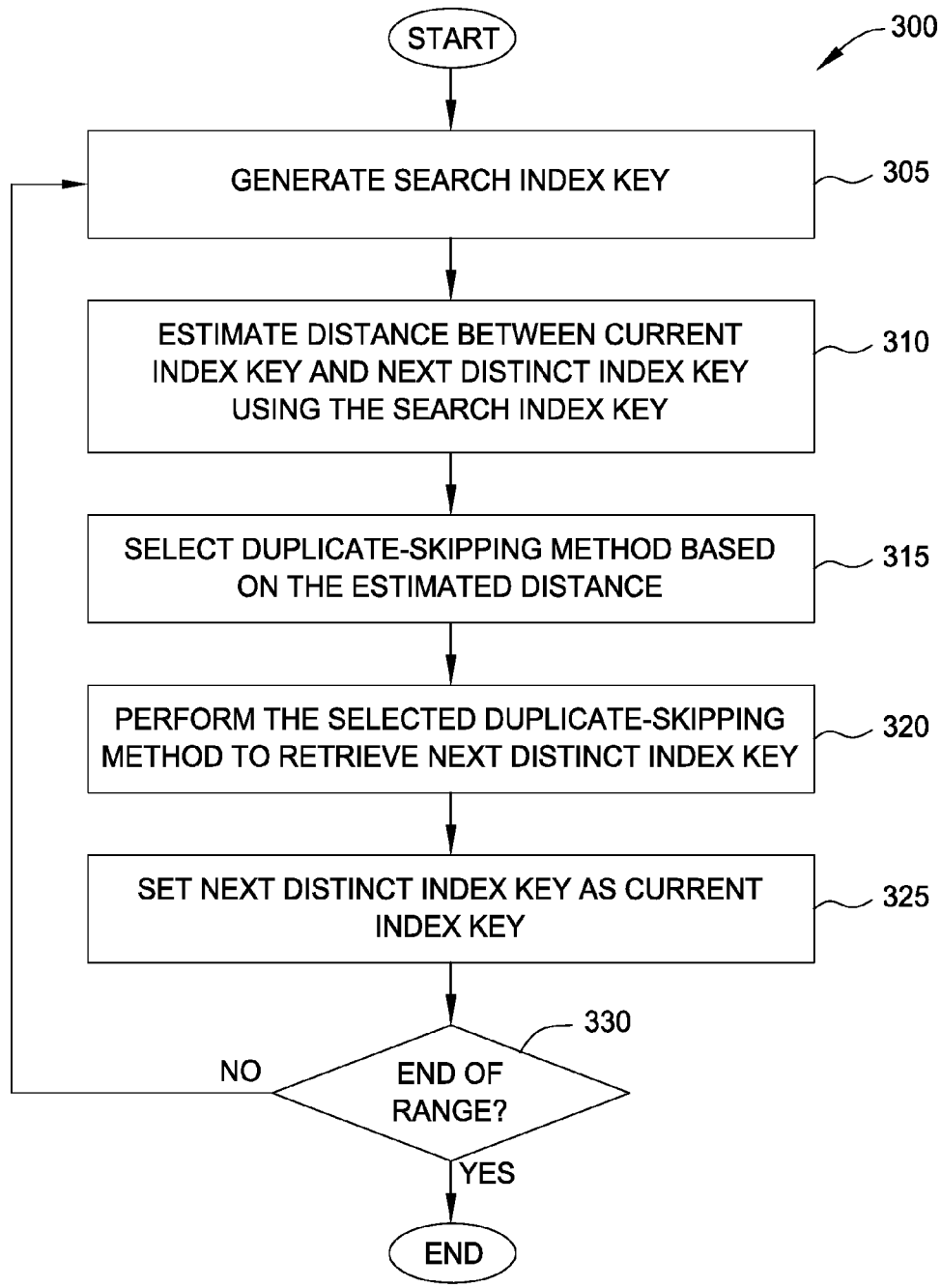
FIG. 3 illustrates a method for setting duplicate-skipping methods when executing a query statement, according to one embodiment.

FIG. 3 illustrates a method 300 for setting duplicate-skipping methods when executing a query statement, according to one embodiment. Method 300 is performed in response to a DBMS receiving a query to execute against a database. In particular, the DBMS receives a query that requests distinct values from certain columns of records in the database. For example, the database query may correspond to a request for records having distinct last names in an employee database.

In one embodiment, the database management application may determine whether the index a reasonable candidate for adjusting duplicate-skipping methods. More specifically, the database management application determines whether the index includes a threshold amount of duplicate values such that the amount of computation involved in performing method 300 is less than the amount of computation involved by not doing so. To do so, the database management application may evaluate statistical data about the database tables to be accessed, such as how many unique records are present in the table relative to the number of total rows. For example, if the index contains a considerable amount of duplicate values, then the database management application proceeds to select an appropriate duplicate-skipping method.

Once the database management application determines the database index is a reasonable candidate for adjusting duplicate-skipping methods, the database management application scans the index for distinct values within a given start and stop key range. As stated, the range may be every leaf page in the index, or alternatively, the range may be constrained by specified predicates. When scanning the index, the database management application records the low and high bounds and the number of keys of the current leaf page being scanned. The database management application may retrieve such information from the header of the leaf page. Further, during the initial scan of the index, the database management application designates the current index key.

At step 305, the database management application generates a search index key having an arbitrary value that is used to locate the next distinct index key. The search key may be generated by masking index columns after the current key value with an appropriate highest value in the index (or an appropriate lowest value, if the scan is in a reverse direction). For example, assume that the current index key has a value corresponding to the last name "Smith." The database management application may generate an arbitrary search index key having a last name value of "SmithZZZZ."

At step 310, the database management application determines the distance between a current index key and a next distinct index key. Because the location of the next distinct index key in the index is not immediately ascertainable, the database management application uses the generated search key to estimate the distance. More specifically, the database management application compares the generated search index key with the page bound of the current index leaf page. If the search index key value is greater than the current page bound, then the next distinct index key does not reside within the current index leaf page. However, if the search index key value is smaller (i.e., the search index key value is within the current leaf index page), then the next distinct key value resides within the current index leaf page.

At step 315, the database management application selects a skipping method based on the estimated distance. In one embodiment, if the estimated distance is at least an index page apart, the database management application sets the duplicate-skipping method to perform a "big skip," that is, the method skips through a larger range of key values than if the estimated distance spanned the same leaf index page. Otherwise, if the next distinct index key resides within the current leaf index page, the database management application sets the duplicate-skipping method to perform a smaller scale operation than the "big skip." FIG. 4 shows how the database management application selects the skipping method in further detail.

At step 320, the database management application performs the selected skipping method to retrieve the next distinct index key. The database management application generates a table row result corresponding to the next distinct index key. At step 325, database management application sets the next distinct index key as the current index key. At step 330, the database management application determines whether the current index key is the last index key in the key range. If not, then the database management application sets the next distinct key as a new current key and repeats the method 300 until the database management application iterates completely through the key range.

Figure 4:
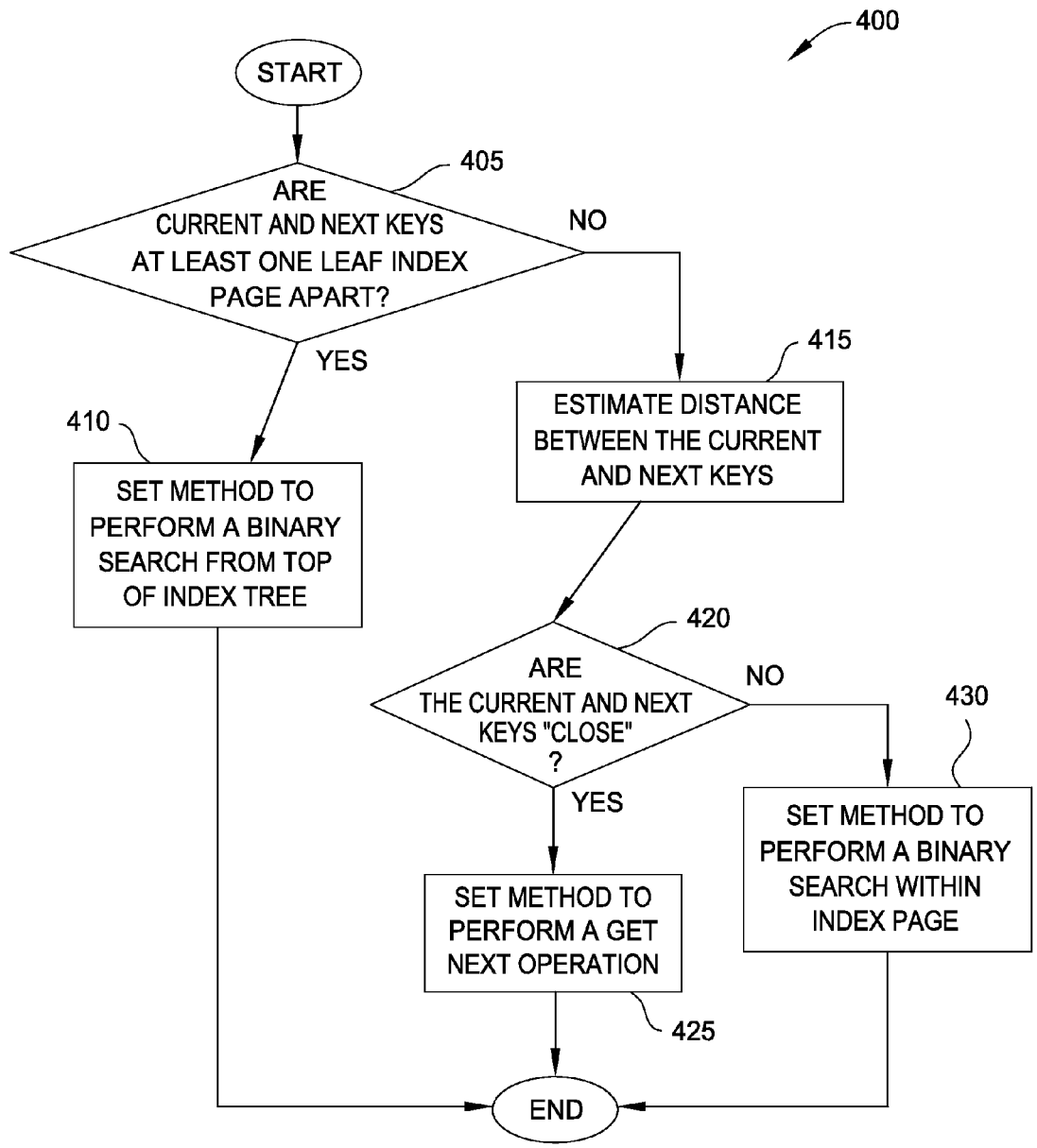
FIG. 4 illustrates a method for selecting a skipping method based on a distance between a current index key and a next distinct index key, according to one embodiment.

FIG. 4 illustrates a method 400 for selecting a duplicate-skipping method based on a distance between a current index key and a next distinct index key, according to one embodiment. Assume that the distance between the current index key and the next distinct index key is already estimated, using, e.g., the techniques described above. The database management application selects a duplicate-skipping method based on the estimated distance.

At step 405, the database management application determines whether the estimated distance between current index key and the next distinct index key are at least a leaf index page apart. The distance may be estimated by comparing the generated search index key with the boundary of the current leaf page. If the distinct keys are separated by at least two leaf index pages, then the current index key has duplicate values that occupy a sizeable portion of the index. At step 410, if the current and next index keys are at least two leaf pages apart, the database management application sets the skipping method as a "big skip" method. In one embodiment, under the "big skip" method, the database management application performs a binary search from the root of the index tree. Doing so allows the database management application to skip over a large amount of duplicate values without actually having to parse through each duplicate value of the current index key. Of course, the "big skip" method is not strictly limited to a binary search algorithm from the root of the index tree. Other search algorithms may be performed on the index to retrieve the next distinct index key.

If the current and next distinct index keys are within the same leaf index page, it is more efficient to use a method that does not require as much processing as a binary search from the root of the index tree. In some cases, the database management application may locate the next distinct index key by simply performing a "get-next" operation and iterating through an insignificant amount of duplicate values.

To determine whether to iterate through consecutive keys, the database management application determines whether the current index key and the next distinct index key are separated by a relatively low amount of duplicate keys. To do so, at step 415, the database management application estimates the distance between the current index key and the generated search key. The estimated distance is compared with properties of the current leaf page. Such properties may be retrieved from the leaf index header and may include the number of index keys in the leaf page, the low bound of the leaf page, and the high bound of the leaf page.

The database management application may use the comparison to determine whether the current index key is "close" to the next distinct index key. For example, the index keys may be "close" if the leaf index page has relatively few index keys and the position of the current index key is located near the high bound of the index page. As another example, the index keys are not "close" if the leaf index page is relatively large, and the position of the current index key is located near the low bound of the index page, and the position of the next distinct index key is located near the high bound of the index page.

At step 425, if the current index key and the next distinct index key is are separated by relatively few duplicate index keys, the database management application sets the method to perform a "get next" operation to iterate through consecutive index keys until reaching the next distinct index key.

At step 430, if the current index key and the next distinct index key are separated by relatively many duplicate index keys, the database management application sets the skipping method as a "little skip" method. In one embodiment, under the "little skip" method, the database management application performs a binary search algorithm from the current index key within the index page to retrieve the next distinct index key. Of course, the "little skip" method is not limited to a binary search algorithm. Other search algorithms may also be applied to the index tree to retrieve the next distinct index key.

In one embodiment, the database management application may disable the "little skip" approach if, when executing the query, the database management application determines that the keys are mostly consecutive and each of the keys are retrieved through a "get next" operation. The database management application may re-enable the "big skip" and "little skip" methods if, at execution time, the database management application detects that duplicate values are repeated across index keys or across index leaf pages.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described, embodiments presented herein provide techniques for setting a duplicate-skipping method when executing a query statement. A database management application estimates a distance between two distinct index keys relative to leaf pages of the index. The database management application uses the estimated distance to determine an appropriate skipping method to perform when retrieving a next distinct index key. Advantageously, by varying the skipping methods based on distances between distinct keys, any possible overhead incurred from merely using the same duplicate-skipping method throughout the index scan is avoided.

While the foregoing is directed to embodiments of the present invention, other and further embodiments of the invention may be devised without departing from the basic scope thereof, and the scope thereof is determined by the claims that follow.

What is claimed is:

1. A computer-implemented method to dynamically adjust a granularity with which to skip duplicate index keys in a database index when identifying records in a database that satisfy a database query, the computer-implemented method comprising:
    estimating a first distance in the database index between a first index key and a next, distinct index key relative to the first index key
    upon determining that the estimated first distance satisfies a first criterion, identifying a second index key by operation of one or more computer processors and by performing a coarser duplicate-skipping operation comprising a binary search from a root of a tree of the database index, the second index key comprising the next, distinct index key relative to the first index key;
    estimating a second distance in the database index between the second index key and a next, distinct index key relative to the second index key; and
    upon determining that the estimated second distance satisfies a second criterion, identifying a third index key by performing a finer duplicate-skipping operation comprising a binary search within a leaf page where the second index key resides, the third index key comprising the next, distinct index key relative to the second index key.

2. The computer-implemented method of claim 1, wherein the first criterion comprises the first index key and its next index key residing in index leaf pages that is at least one index page apart, wherein the second criterion comprises the second index key and its next index key residing in the same index leaf page.

3. The computer-implemented method of claim 1, further comprising:
  performing a get-next operation in order to identify a fourth index key.

4. The computer-implemented method of claim 3, further comprising:
  disabling at least one of the coarser duplicate-skipping operation and the finer duplicate-skipping operation when, while executing the database query, the get-next operation is performed consecutively for a specified amount of times.

5. The computer-implemented method of claim 1, further comprising:
  inserting a database record corresponding to a given index key into a result set, wherein the given key is selected from the second and third index keys.

6. The computer-implemented method of claim 1, wherein the granularity with which to skip duplicate index keys in the database index is dynamically adjusted in order to reduce a processing overhead associated with identifying the records in the database that satisfy the database query, wherein the computer-implemented method further comprises:
  estimating a third distance in the database index between the third index key and a next, distinct index key relative to the third index key; and
  upon determining that the estimated third distance satisfies a third criterion, identifying a fourth index key by performing a get-next operation, which does not skip any duplicates, the fourth index key comprising the next, distinct index key relative to the third index key, wherein the first, second, and third criteria are distinct.

7. The computer-implemented method of claim 6, wherein estimating the first distance between the first index key and the next, distinct index key relative to the first index key comprises:
  generating a search index key, wherein the search index key is given the highest value in the database index of the first index key; and
  determining whether the first index key and the search index key are stored in the same index page.

8. The computer-implemented method of claim 7, further comprising:
  for each of the second, third, and fourth index keys, inserting a database record corresponding to the respective index key into a result set;
  outputting the result set responsive to the database query; and
  upon determining that the get-next operation is performed consecutively for a predefined number of times, automatically disabling at least one operation, selected from the coarser duplicate-skipping operation and the finer duplicate-skipping operation, from being performed.

9. The computer-implemented method of claim 8, wherein the coarser duplicate-skipping operation is used to skip duplicate index keys only upon determining that the estimated first distance satisfies the first criterion, the first criterion comprising a current index key and a next index key residing in index leaf pages at least one index page apart;
  wherein the finer duplicate-skipping operation is used to skip duplicate index keys only upon determining that the estimated second distance satisfies the second criterion, the second criterion comprising the current index key and the next index key residing in the same index leaf page.

10. The computer-implemented method of claim 9, wherein the granularity with which to skip duplicate index keys in the database index is dynamically adjusted by a database management system for the database, wherein the coarser and finer duplicate-skipping operations and the get-next operation are performed by the database management system;
  wherein the get-next operation is used to avoid skipping any duplicate index keys, only upon determining that the estimated third distance satisfies the third criterion, the third criterion being satisfied only upon satisfaction of both: (i) the leaf index page having below a threshold count of index keys; and (ii) the current index key being located near a higher bound of the leaf index page.

11. The computer-implemented method of claim 1, wherein the granularity with which to skip duplicate index keys in the database index is dynamically adjusted in order to reduce a processing overhead associated with identifying the records in the database that satisfy the database query.

12. The computer-implemented method of claim 1, further comprising:
  estimating a third distance in the database index between the third index key and a next, distinct index key relative to the third index key.

13. The computer-implemented method of claim 12, further comprising:
  upon determining that the estimated third distance satisfies a third criterion, identifying a fourth index key by performing a get-next operation, which does not skip any duplicates, the fourth index key comprising the next, distinct index key relative to the third index key.

14. The computer-implemented method of claim 1, wherein estimating the first distance between the first index key and the next, distinct index key relative to the first index key comprises:
  generating a search index key, wherein the search index key is given the highest value in the database index of the first index key.

15. The computer-implemented method of claim 14, wherein estimating the first distance between the first index key and the next, distinct index key relative to the first index key further comprises:
  determining whether the first index key and the search index key are stored in the same index page.

16. The computer-implemented method of claim 1, further comprising:
  inserting a database record corresponding to a given index key into a result set, wherein the given key is selected from the second and third index keys.

17. The computer-implemented method of claim 1, further comprising:
  for each of the second and third index keys, inserting a database record corresponding to the respective index key into a result set.

18. The computer-implemented method of claim 17, further comprising:
  outputting the result set responsive to the database query.

19. The computer-implemented method of claim 1, further comprising:
  upon determining that a get-next operation is performed consecutively for a predefined number of times, automatically disabling at least one operation from being performed.

20. The computer-implemented method of claim 19, wherein the at least one operation comprises the coarser duplicate-skipping operation.

21. The computer-implemented method of claim 19, wherein the at least one operation comprises the finer duplicate-skipping operation.

\* \* \* \* \*